ADDRESS SELECTION SYSTEM FOR MEMORY DEVICES

Filed Feb. 5, 1964 4 Sheets-Sheet 1

INVENTORS.
ERIC E. BITTMANN
SANFORD V. TERRELL JR.
BY Samuel Kane
ATTORNEY

ADDRESS SELECTION SYSTEM FOR MEMORY DEVICES

INVENTORS.
ERIC E. BITTMANN
SANFORD V. TERRELL JR.
BY Samuel Kane
ATTORNEY

July 30, 1968 E. E. BITTMANN ET AL 3,395,404
ADDRESS SELECTION SYSTEM FOR MEMORY DEVICES
Filed Feb. 5, 1964 4 Sheets-Sheet 3

INVENTORS.
ERIC E. BITTMANN
SANFORD V. TERRELL JR.
BY
Samuel Kane
ATTORNEY

INVENTORS.
ERIC E. BITTMANN
SANFORD V. TERRELL JR.

BY Samuel Kane
ATTORNEY

United States Patent Office 3,395,404

Patented July 30, 1968

3,395,404

ADDRESS SELECTION SYSTEM FOR MEMORY DEVICES

Eric E. Bittmann, Downington, and Sanford V. Terrell, Jr., Spring City, Pa., assignors to Burroughs Corporation, Detroit, Mich., a corporation of Michigan Filed Feb. 5, 1964, Ser. No. 342,662
21 Claims. (Cl. 340—174)

ABSTRACT OF THE DISCLOSURE

A matrix of selection units is energized selectively for driving current through a selected conductor in a system of magnetic memory devices. Each selection unit utilizes a balanced transmission line with balanced circuitry, so that operation results in a balanced distribution of current and is substantially noise-free. Electronic control means are provided which are actuated to obtain current flow in the selected transmission line. An output device coupled to each transmission line responds to the current flow in its associated selected transmission line to drive current in the selected conductor of the memory system. Energy-discharging devices are provided so that energy which has been stored in the distributed inductive and capacitive network of an operated selected transmission line is dissipated so that it will not appear later as undesirable noise. To obtain faster operating speeds, the output devices are omitted, whereby the output from each transmission line is taken in a more direct manner.

This invention relates generally to memory devices and more particularly to address selection systems for magnetic memory devices. While the invention is not limited thereto, it finds special application as a selection system for magnetic thin film storage devices which are capable of interrogation and re-insertion of information (read-write cycle) at high speeds, and which are further capable of utilizing the so-called "linear word select" mode of operation, and therefore the invention will be described hereinafter in connection with such use.

The use of magnetic thin film memory devices of the kind described gives rise to certain major problems which are overcome by the present invention. One of such problems is that due to capacitive noise coupling. This coupling arises from the fact that in the physical construction of magnetic thin film memory planes, the word and sense lines are separated by a dielectric at the points where they intersect over the magnetic thin film storage bits, and thereby form capacitors at these points. Due to normal word selection techniques, which generally require relatively large static bias voltages for proper operation, large transient voltages are encountered during word selection time and noise voltages are subsequently coupled from the word lines to the sense lines through the above-mentioned capacitors. An object of the present invention is to minimize this capacitively coupled noise.

Another major problem that is encountered in the use of such magnetic thin film memory systems is that due to magnetic noise radiation or induction. This problem may arise, for example, where a large word current is required, and rise and fall times are in the nanosecond region and sense lines outputs are in the order of a few millivolts. The problem in such a case is then one of making high current, fast rise and fall times compatible with low signal output and high gain wide band amplification. This problem is made difficult by magnetic noise radiating into the memory and amplifying circuitry which is caused by adjacent current-carrying lines. Accordingly, it is another object of the present invention to eliminate the undesirable effects of such magnetic radiation.

Another object of the invention is to provide an address selection system which reduces interference and maintains bandwidth.

A further object of the invention is to provide an address selection system having transformer output and wherein the circuitry offers little or no pulse repetition frequency limitations and provides for DC restoration of the current pulse in the transformer, and fast recovery of the transformer.

Still a further object of the invention is to provide an address selection system for magnetic thin film memory devices, whose use contributes to obtaining faithful noise-free reproduction of the film outputs.

In accordance with the above objects, and considered first in its broad aspects, the invention utilizes a plurality of transmission lines whereby noise radiated by each side of each line is cancelled by the noise radiated by the other side of the same line. Associated circuitry is balanced, to thereby provide balanced lines with balanced current distribution therein. In a preferred embodiment of the invention, each transmission line is coupled to an output device, which in one form is constructed as a transformer, and is provided with asymmetrical current conducting means arranged to limit the direction of current flow through the output device. In the preferred embodiment illustrated, the output device or transformer not only isolates the load from the selection system but is also associated with an asymmetrical current conducting means which makes it possible to overcome pulse repetition frequency problems, and to obtain DC restoration in the secondary circuit of the transformer.

The asymmetrical current conducting means which limits current flow directionally in a transmission line is reverse biased, and in operation the reverse biasing is first lessened by actuating a first electronic control means which is coupled to one end of the transmission line. A second electronic control means is coupled to the other end of the transmission line, and this is actuated to provide an output at least a portion of which is in time coincidence with at least a portion of the output of the first electronic control means whereby the asymmetrical current conducting means last mentioned becomes forward biased and enables current flow through the transmission line and the output device coupled thereto.

In a variation of the invention, the output device and its associated asymmetrical current conducting means are omitted, whereby the output of each transmission line is taken in a more direct manner.

The invention will be more clearly understood when the following detailed description of specific embodiments thereof is read in conjunction with the accompanying drawings, in which.

Figure 1:
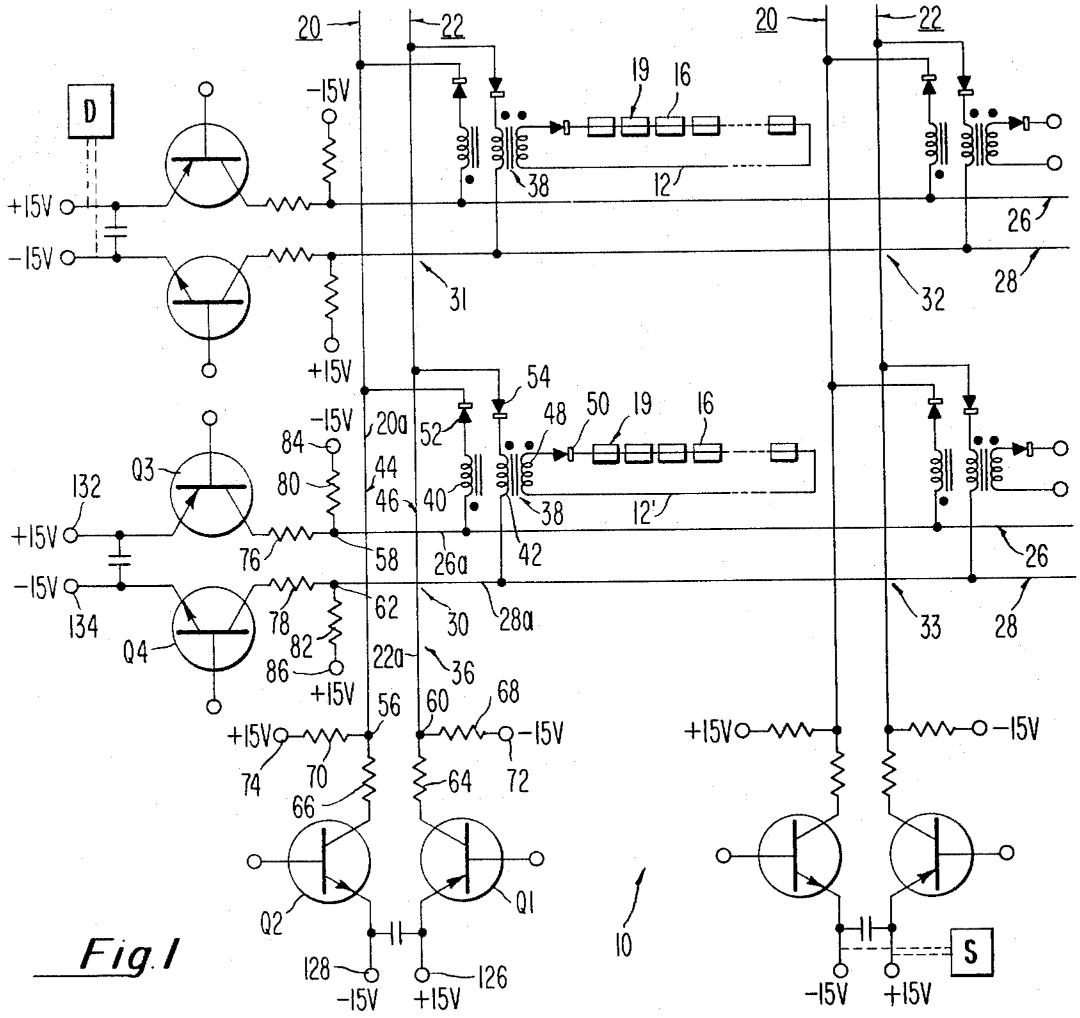
FIGURE 1 is a schematic diagram of an address selection matrix constructed in accordance with the invention.
Figure 2:
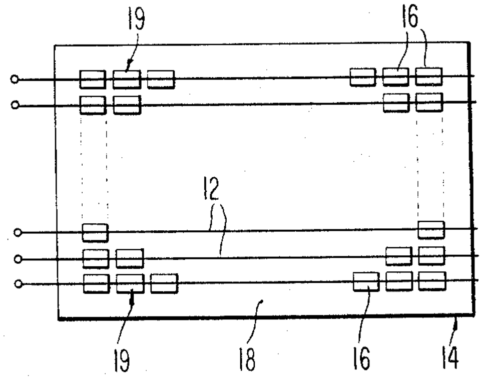
FIGURE 2 is a diagrammatic plan view of a magnetic thin film memory substrate having a plurality of magnetic thin film storage elements or bits thereon arranged in horizontal arrays, and showing each array of bits inductively encircled by a word line conductor.
Figure 3:
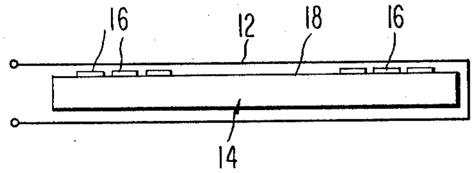
FIGURE 3 is a front elevation of the magnetic thin film memory substrate of FIGURE 2.
Figure 4:
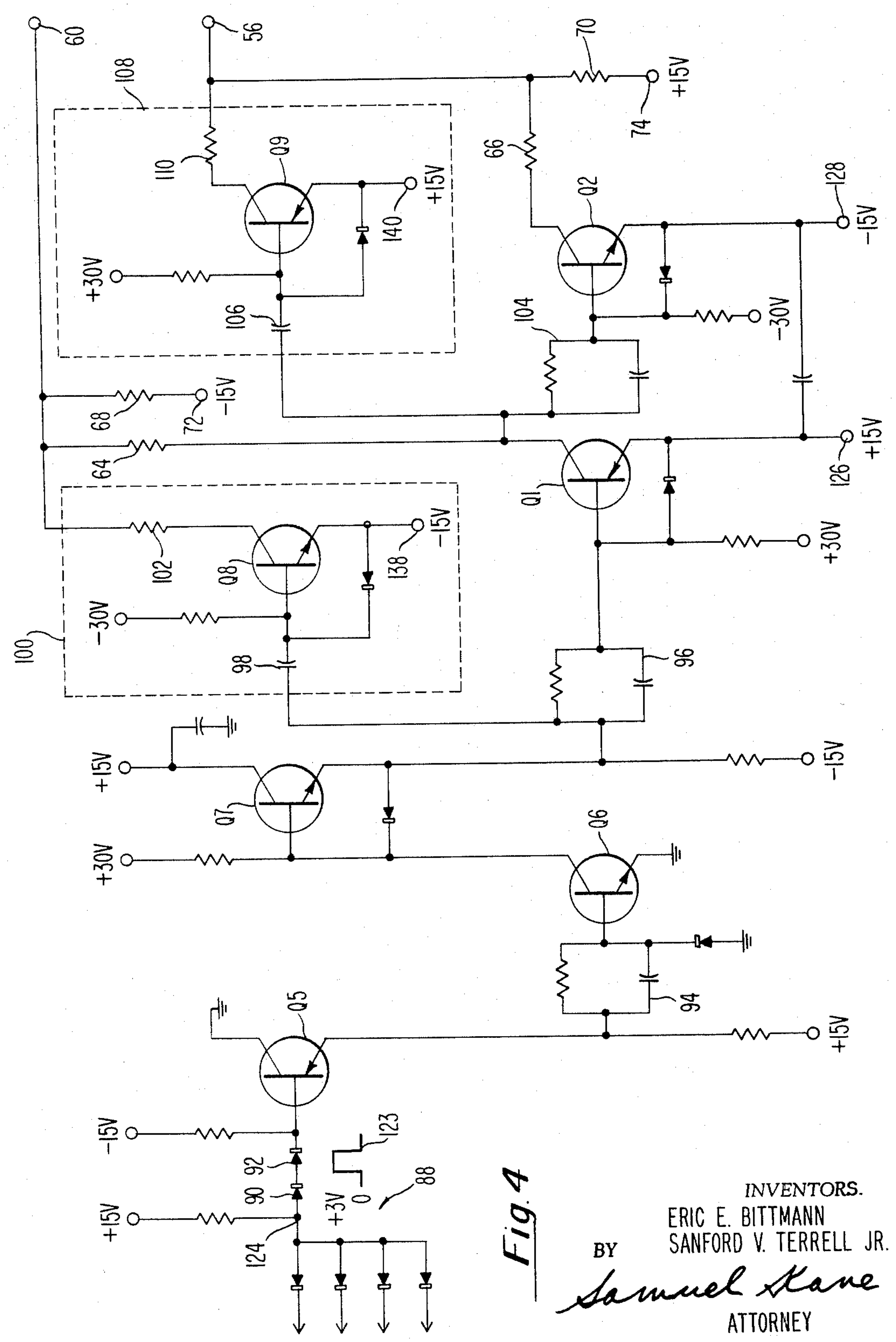
FIGURE 4 is a schematic diagram of a circuit which, for purposes of convenience, will be described as a switch circuit, and which is used for driving a pair of column transistors and associated circuitry of one of the matrix columns shown in FIGURE 1, and including also additional circuitry for discharging energy from a transmission line.
Figure 5:
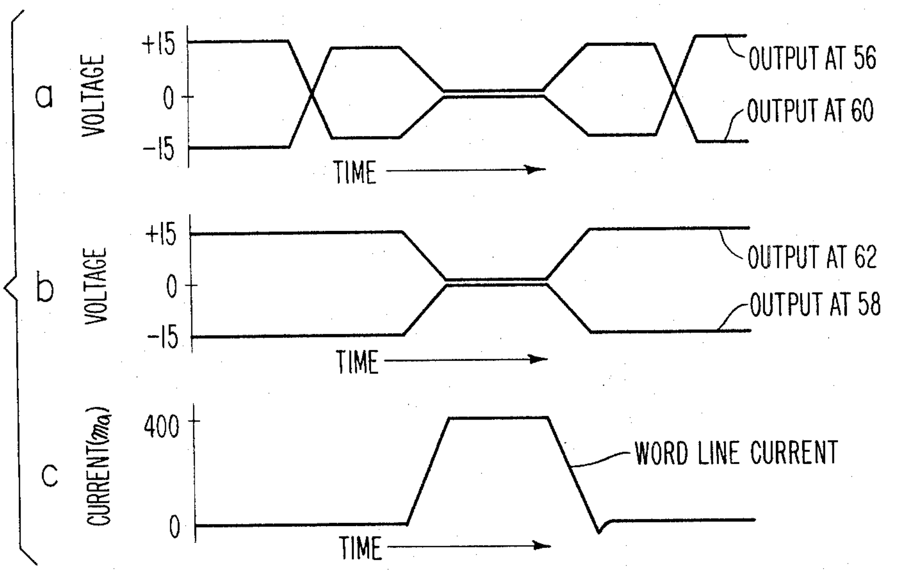
FIGURE 5 is a chart of waveforms showing output conditions of the circuitry in FIGURE 1 at particular times.
Figure 6:
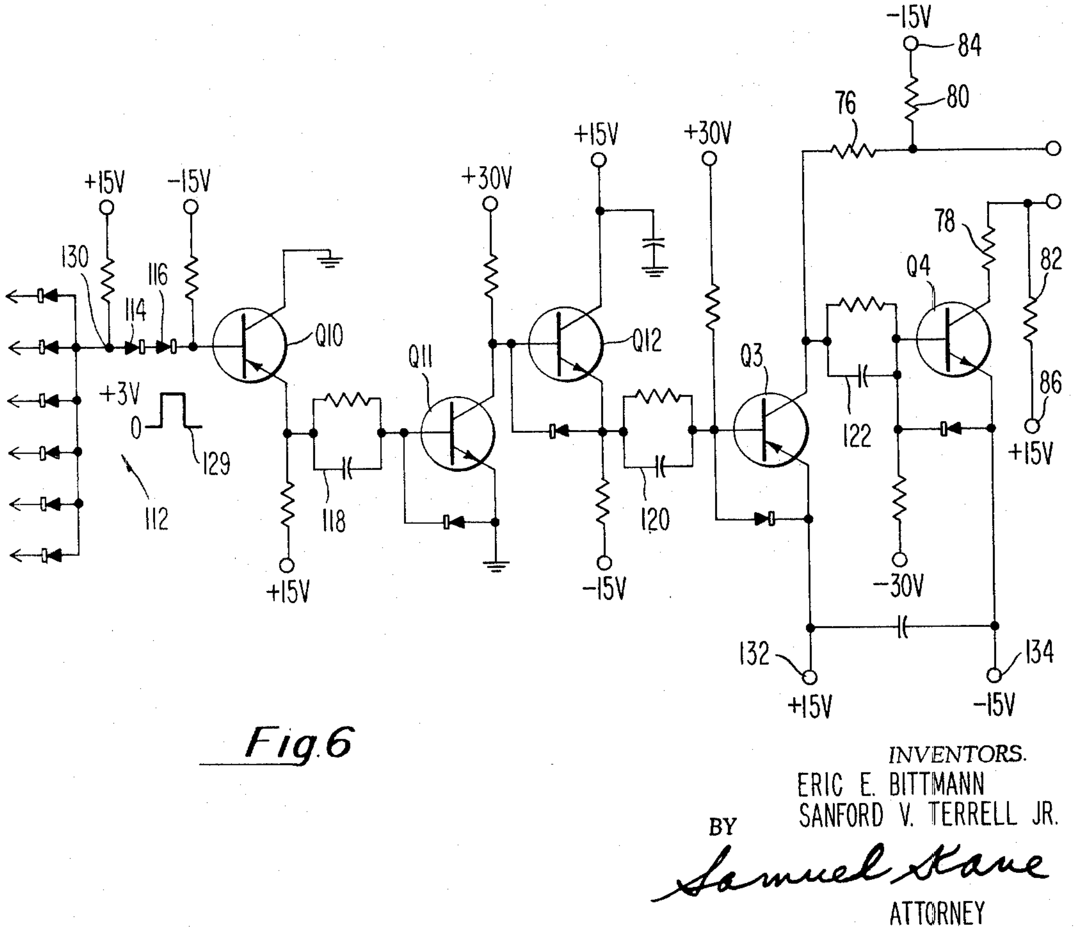
FIGURE 6 is a schematic diagram of a circuit which, for purposes of convenience, will be designated as a driver circuit, and which is used for operating a pair of row transistors and associated circuitry of one of the matrix rows shown in FIGURE 1.

Turning now to the details of the drawings, and first with reference to FIGURES 1, 2 and 3 thereof, the preferred embodiment of the invention illustrated comprises a selection matrix 10, shown in FIGURE 1 with associated circuitry, elements of which are also shown in FIGURES 4 and 6, for selecting a particular word line conductor 12 of a plurality of such conductors of a magnetic thin film memory, for a memory operation. FIGURES 2 and 3 illustrate diagrammatically a substrate 14 of such a memory with a plurality of arrays of magnetic thin film memory elements or bits 16 on a surface 18 of the substrate. Each array of magnetic bits 16 is illustrated as a horizontal line 19 of such bits 16 in FIGURE 2, and each array or line 19 of bits is shown as being inductively encircled by a word line conductor 12. Selection of a particular array 19 of magnetic thin film memory elements 16 for a memory operation means, in the present disclosure, causing a current to flow in the particular word line conductor 12 which encircles the selected array 19 of magnetic bits 16. While there are other elements and conductors associated with such magnetic thin film memory substrates 14 for performing memory operations, for purposes of the present invention, a discussion of these other elements has been omitted here since it is not considered necessary for an understanding of the present invention.

The selection matrix 10 comprises a plurality of pairs of parallel vertical or column conductors 20 and 22 and a plurality of pairs of parallel horizontal or row conductors 26 and 28 which electrically intersect the vertical or column conductors 20 and 22 at electrical intersections 30, 31, 32 and 33. Each electrical intersection 30, 31, 32 and 33 corresponds to a selection unit circuit for selecting the associated word line conductor 12 for a memory operation. Thus with the 2 x 2 matrix shown in FIGURE 1, there are four electrical intersections and therefore there would be provided a corresponding number of selection unit circuits each for selecting the associated word line conductor 12 for a memory operation. Thus the illustrative matrix, when provided with four selection unit circuits, could be operated to select any one of four word line conductors 12 for a memory operation. The number of electrical intersections, such as 30–33, and the corresponding number of selection unit circuits is illustrative only and may be varied to suit particular requirements. Also, the number of word line conductors 12 shown in FIGURE 2 is illustrative only, and may also be varied to suit particular requirements.

The selection units or circuits for the respective electrical intersections 30–33 are similar and therefore for purposes of simplicity the drawings have been prepared to illustrate complete circuitry for operating only one of the selection unit circuits. Accordingly, a description of only one selection unit will be given, and this will be the one corresponding to intersection 30.

The selection unit associated with intersection 30 includes a transmission line 36 to which is coupled an output device 38 for relating current flow in the transmission line 36 to current flow in the load, the latter in this case being the selected word line conductor 12'.

The particular output device 38 illustrated in the present embodiment is a transformer having two primary windings 40 and 42. The primary winding 40 is connected in one side 44 of the transmission line 36 and the primary winding 42 is connected in the other side 46 of the transmission line. The secondary winding 48 of the transformer is connected to the associated word line conductor 12' through a unidirectional or asymmetrical current conducting device 50, which in the present embodiment of the invention is illustrated as a diode.

Unidirectional or asymmetrical current conducting means is provided also in each side of the transmission line 36 and is illustrated herein as a diode 52 in the side 44 of the line and a diode 54 in the side 46 of the line.

The side 44 of the line 36 commences at a junction 56 and includes a portion **20*a* of the vertical conductor 20, the diode 52, the primary winding 40, and a portion 26*a* of the row conductor 26 which extends to a junction 58. The side 46 of the line commences at a junction 60 and includes a portion 22*a* of the vertical column conductor 22, the diode 54, the primary winding 42, and a portion 28*a* of the horizontal row conductor 28 which extends to a junction 62**.

An electronic control means connected to the vertical or column end of the transmission line 36 comprises a switching means which in this embodiment includes a transistor Q1 and a transistor Q2 connected, respectively, to the junctions 60 and 56 through line-terminating resistors 64 and 66, respectively. Resistors 68 and 70 are connected, respectively, to the junctions 60 and 56, and to sources of potential 72 and 74.

An electronic control means connected to the horizontal or row end of the transmission line 36 comprises a switching means which in this embodiment includes a transistor Q3 and a transistor Q4 connected, respectively, to the junctions 58 and 62 through line-terminating resistors 76 and 78. Resistors 80 and 82 are connected, respectively, to the junctions 58 and 62 and to sources of potential 84 and 86.

The switch circuit for actuating the column conductors is shown in FIGURE 4 and includes transistors Q1 and Q2 as well as other circuit elements shown in FIGURE 1.

The switch circuit (FIGURE 4) comprises an AND gate 88 coupled to the base of a transistor Q5 through a pair of diodes 90 and 92. Transistor Q5 is in an emitter-follower circuit and has its emitter electrode connected to the base of a transistor Q6 through a parallel RC circuit 94. The collector of transistor Q6 is coupled to the base of a transistor Q7 contained in a second emitter-follower circuit. The emitter of transistor Q7 is connected along one path to the base of the column transistor Q1 through a parallel RC circuit 96 and along another path to the base of a transistor Q8 through a capacitor 98, the transistor Q8 and capacitor 98 being parts of an energy-discharging circuit 100. The transistor Q8 is connected to the junction 60 through a resistor 102 in its collector circuit.

The column transistor Q1 is arranged to drive the column transistor Q2 and for this purpose has its collector coupled to the base of transistor Q2 through a parallel RC circuit 104. The collector of transistor Q1 is also coupled to the base of a transistor Q9 through a capacitor 106, the transistor Q9 and capacitor 106 being included in an energy-discharging circuit 108. The collector of transistor Q9 is connected to the junction 56 through a resistor 110 in its collector circuit.

Except for the energy-discharging circuits 100 and 108 shown in FIGURE 4, the driver circuit shown in FIGURE 6 for actuating the row transistors Q3 and Q4 is substantially the same as the switch portion of the circuit of FIGURE 4 which is used for actuating the column transistors Q1 and Q2.

The driver circuit (FIGURE 6) similarly includes an AND gate 112 which is coupled to the base of a transistor Q10 through two diodes 114 and 116. The transistor Q10 is in an emitter-follower circuit and its emitter electrode is connected to the base of a transistor Q11 through a parallel RC circuit 118. The collector of the transistor Q11 is connected to the base of a transistor Q12 of a second emitter-follower circuit. The emitter of the transistor Q12 is coupled to the base of the row transistor Q3 through a parallel RC circuit 120. The row transistor Q3 is arranged to drive the row transistor Q4 and has its collector connected to the base of transistor Q4 through a parallel RC circuit 122.

When the selection system is in operation, transistors Q5, Q7, Q10 and Q12 are in the ON condition and conducting, and all other transistors are initially in the OFF condition and non-conducting. The circuits are designed so that transistors Q1, Q2, Q3 and Q4 are operated in the saturating mode, and the diodes 52 and 54 are initially reverse biased by the potential sources 74 and 84 and 72 and 86, respectively.

The operation of the selection system for selecting the illustrative word line conductor 12' and its associated array 19 of magnetic thin film memory elements 16 for a memory operation is accomplished by first turning ON the column transistors Q1 and Q2. This is done by introducing an input signal 123 to a junction 124 (FIGURE 4) through the AND gate 88 whereby the base and emitter potentials of transistor Q5 will increase and cause current flow to the base of transistor Q6, thereby turning this transistor ON. As transistor Q6 turns ON, its collector potential will fall toward ground causing the potential of the emitter of transistor Q7 also to fall whereby current will flow to the base of the column transistor Q1, and thereby turn this transistor ON. The negative-going signal at the emitter of transistor Q7 will also appear at the base of transistor Q8 and will tend to hold this transistor in the OFF condition at this time.

As transistor Q1 turns ON, its collector potential will rise whereby current will flow to the base of column transistor Q2 and thereby turn this transistor ON. The positive-going potential of the collector of transistor Q1 will also cause a positive-going signal to appear at the base of transistor Q9 and which will tend to hold this transistor in the OFF condition at this time.

When transistor Q1 is turned ON, the potential of the junction 60 will rise to approximately +12 volts by reason of the dividing action between the potential source 72, the resistor 68, the resistor 64, the transistor Q1 and a potential source 126. This will reduce the reverse biasing of the diode 54 to approximately 3 volts. Similarly, when the transistor Q2 is turned ON, the potential of the junction 56 will fall to approximately −12 volts by reason of the dividing action between the potential source 74, the resistor 70, the resistor 66, the transistor Q2 and a potential source 128. This action will similarly lessen the reverse biasing of the diode 52 to approximately 3 volts. Also, by virtue of the low impedance between the potential sources 126 and 128, the transmission line 36 will be effectively terminated at this time by the terminating resistors 64 and 66 which have been chosen to be equal to the characteristic impedance of the line. Thus the line 36 is now effectively terminated at this end in its characteristic impedance.

The next step in the selection process is to turn ON the corresponding row transistors Q3 and Q4. This is done by introducing an input signal 129 to a junction 130 (FIGURE 6) through the AND gate 112 whereby the potentials of the base and emitter of transistor Q10 will increase and cause current to flow to the base of transistor Q11, and thereby turn this transistor ON. As transistor Q11 turns ON, its collector potential will fall toward ground causing the potential of the emitter of transistor Q12 also to fall whereby current will flow to the base of row transistor Q3, and thereby turn this transistor ON. As transistor Q3 turns ON, its collector potential will rise whereby current will flow to the base of the row transistor Q4, and thereby turn this transistor ON.

When transistor Q3 turns ON, the potential of the junction 58 will rise toward almost ground potential by reason of the dividing action between the potential source 132, transistor Q3, resistor 76, diode 52, resistor 66, transistor Q2, and the potential source 128. This will forward bias the diode 52 and cause current to flow through the side 44 of the transmission line 36 which contains the primary winding 40. Similarly, when the transistor Q4 turns ON, the potential of the junction 62 will fall to approximately almost ground by reason of the dividing action between the potential source 126, transistor Q1, resistor 64, diode 54, the resistor 78, the transistor Q4, and a potential source 134. This action will forward bias the diode 54 whereby current will flow in the other side 46 of the transmission line which include the primary winding 42. By virtue of the low impedance between the potential sources 132 and 134, the transmission line 36 will be effectively terminated at this time by the terminating resistors 76 and 78 which have been chosen to be equal to the characteristic impedance of the line. Thus the line is now effectively terminated at this end, also, in its characteristic impedance.

Current is now flowing in opposite directions in the primary windings 40 and 42, and these windings and the secondary winding 48 in the present embodiment are so chosen with respect to turns ratios and are so constructed and oriented that the current induced in the secondary winding 48 will be approximately twice the amplitude of the current flowing in each of the primary windings 40 and 42. In the present illustration, current flowing in each of the primary windings is approximately 200 milliamperes and in the secondary winding 48 and in the word line conductor 12' connected thereto it is approximately 400 milliamperes.

To complete the selection operation, transistors Q3 and Q4 are cut off first, by turning off the input signal 129. This has the effect of opening or unterminating the transmission line at the transistors Q3 and Q4. The switch circuit (FIGURE 4), including the column transistors Q1 and Q2 are then facing an unterminated transmission line 36 which has energy stored in its distributed inductive and capacitive network. In order to dissipate this energy so that it will not appear in the form of undesirable noise, due to its storage lasting into the next selection cycle, the energy-discharging circuits 100 and 108 have been provided.

Thus when the transistors Q1 and Q2 are next cut OFF by turning off the input signal 123, the conclusion of the signal will have the effect of causing a positive-going signal to appear at the base of transistor Q8 and a negative-going signal to appear at the base of transistor Q9, thereby turning these two transistors ON. The inductive and capacitive energy in the side 46 of the transmission line 36 will therefore discharge through the junction 60, the resistor 102, the transistor Q8 and a potential source 138. Similarly, the inductive and capacitive energy of the side 44 of the transmission line 36 will discharge through the junction 56, the resistor 110, the transistor Q9 and a potential source 140.

The foregoing discussion has dealt with only one selection unit and this has been the one corresponding to electrical intersection 30. To provide an additional selection unit associated with the electrical intersection 31, there need only be provided, additionally, another driver circuit similar to the one shown in FIGURE 6, and this driver circuit is illustrated diagrammatically in FIGURE 1 by the blocked letter D. Thus the selection unit associated with the electrical intersection 31 includes a driver circuit D and the same switch circuit (FIGURE 4) that is used for driving the transistors Q1 and Q2. In other words, the switch circuit (FIGURE 4) is common to more than one selection unit.

Similarly, to provide additional selection units associated with the electrical intersections 32 and 33, there need only be provided, in addition to the driver circuit D, another switch circuit similar to the one shown in FIGURE 4, and this switch circuit is illustrated diagrammatically in FIGURE 1 by the blocked letter S. Thus the selection unit associated with the electrical intersection 32 includes the driver circuit D and the switch circuit S, and the selection unit associated with the electrical intersection 33 includes the switch circuit S and the same driver circuit (FIGURE 6) that is used for driving the transistors Q3 and Q4.

It will now be clear that each driver circuit (FIGURE 6 or D) and each switch circuit (FIGURE 4 or S) may be common to more than one selection unit.

Figure 7:
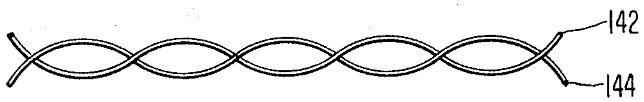
FIGURE 7 illustrates a modified form of the transmission line conductor arrangement.

The column conductors 20 and 22 and the row conductors 26 and 28 have been illustrated as conventionally parallel portions of transmission lines. For many applications, this parallel arrangement of the line conductors will afford good results. However, it has been found that if the transmission line conductors are twisted together helically in the manner illustrated by the conductors 142 and 144 in FIGURE 7, which for mechanical assembly reasons is the preferred arrangement of the line conductors, both the characteristic impedance and magnetic noise radiation of the lines will be contained. Accordingly, the word "parallel" as used in the claims to define the positional relationship of the column and row conductors is intended to include both parallel conductors as shown in FIGURE 1, or substantially parallel, and twisted conductors similar to those shown in FIGURE 7.

Figure 8:
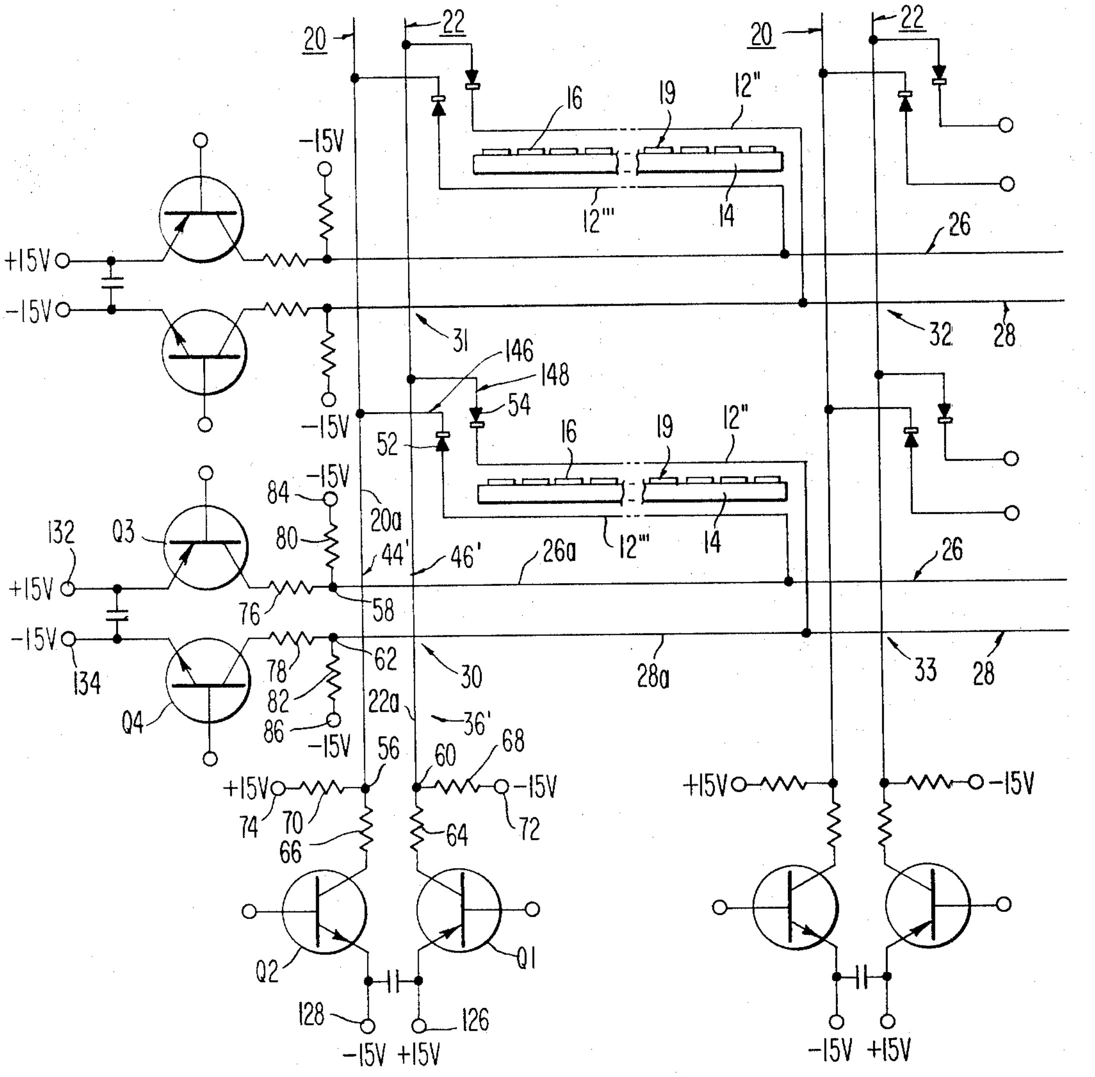
FIGURE 8 illustrates a modification in which the output devices and their associated asymmetrical current conducting means are omitted.

In the modification shown in FIGURE 8, the transformers 38 and diodes 50 are omitted, and both sides of each transmission line are inductively coupled to an array 19 of magnetic thin film memory bits 16, by means of word line conductors 12'' and 12''' that are connected in the respective sides of the transmission lines. Thus the side 44' of the transmission line 36' which is associated with the electrical intersection 30, for example, commences at the junction 56 and includes the portion 20*a* of the column conductor 20, the branch circuit 146 which includes the diode 52 and the word line conductor 12''', and the portion 26*a* of the row conductor 26 which extends to the junction 58. Similarly, the side 46' of the transmission line 36' commences at the junction 60 and includes the portion 22*a* of the column conductor 22, the branch circuit 148 which includes the diode 54 and the word line conductor 12'', and the portion 28*a* of the row conductor 28 which extends to the junction 62. With the modification illustrated in FIGURE 8, faster operating speeds can be obtained because transformer recovery time has been eliminated.

While there has been shown specific circuitry exemplary of the principles of the invention, it is to be understood that this circuitry represents specific forms of the invention, and that the invention is capable of being constructed in a variety of circuit configurations and arrangements without departing from its true spirit and scope. Accordingly, it is to be understood that the invention is not to be limited by the specific circuits disclosed, but only by the subjoined claims.

What is claimed is:

1. A matrix selection system for a memory device having a plurality of magnetic thin film memory elements disposed in electrical arrays, each array containing a number of said magnetic thin film memory elements, said system comprising, a plurality of pairs of parallel conductors arranged in electrical rows and in electrical columns, said electrical rows electrically intersecting said electrical columns, and a plurality of selection units each corresponding to one of said intersections and operable for electrically subjecting one of said electrical arrays of magnetic thin film memory elements to a memory operation, each said selection unit comprising, a transformer having a secondary winding and two primary windings, a conductor in the circuit of said secondary winding inductively encircling the magnetic thin film memory elements in one of said arrays, a first diode in said secondary circuit, a transmission line having two sides, each side of the line including a portion of one of said column conductors and a portion of one of said row conductors and including also one of said primary windings, one side of the line including a second diode in series with the primary winding in that side of the line and the other side of the line including a third diode in series with the primary winding in said other side of the line, means reverse biasing said second and third diodes, a first transistor connected to one end of said one side of the line, a second transistor connected to the corresponding end of said other side of the line, said first and second transistors being of opposite conductivity type and adapted to be actuated to provide an output for lessening the reverse biasing of said second and third diodes, means terminating one end of said transmission line in the characteristic impedance of the line when said first and second transistors are actuated, a third transistor connected to the other end of said one side of the line, a fourth transistor connected to the other end of said other side of the line, said third and fourth transistors being of opposite conductivity type and adapted to be actuated to provide an output and in such manner as to have at least a portion of their output in time coincidence with at least a portion of the output of said first and second transistors to thereby forward bias said second and third diodes whereby current will flow in opposite directions through said sides, respectively, of said transmission line, means terminating the other end of said transmission line in the characteristic impedance of the line when said third and fourth transistors are actuated, a first circuit connected to said first transistor for discharging inductive and capacitive energy from said first side of the line, a second circuit connected to said second transistor for discharging inductive and capacitive energy from said other side of the line, and electronic means for actuating said first, second, third and fourth transistors and in that order.

2. A matrix selection system for a memory device having a plurality of magnetic thin film memory elements disposed in electrical arrays, each array containing a number of said magnetic thin film memory elements, said system comprising, a plurality of pairs of parallel conductors arranged in electrical rows and in electrical columns, said electrical rows electrically intersecting said electrical columns, and a plurality of selection units each corresponding to one of said intersections and operable for electrically subjecting one of said electrical arrays of magnetic thin film memory elements to a memory operation, each said selection unit comprising, a transmission line having two sides, each side of the line including a portion of one of said column conductors and a portion of one of said row conductors, one side of the line including a unidirectional device for limiting current flow therein to one direction, and the other side of the line including a unidirectional device for limiting current flow therein to one direction, means reverse biasing said unidirectional devices, a first transistor connected to one end of said one side of the line, a second transistor connected to the corresponding end of said other side of the line, said first and second transistors being of opposite conductivity type and adapted to be actuated to provide an output for lessening the reverse biasing of said unidirectional devices, means terminating one end of said transmission line in the characteristic impedance of the line when said first and second transistors are actuated, a third transistor connected to the other end of said one side of the line, a fourth transistor connected to the other end of said other side of the line, said third and fourth transistors being of opposite conductivity type and adapted to be actuated to provide an output and in such manner as to have at least a portion of their output in time coincidence with at least a portion of the output of said first and second transistors to thereby forward bias said unidirectional devices whereby current will flow in opposite directions through said sides, respectively, of said transmission line, means terminating the other end of said transmission line in the characteristic impedance of the line when said third and fourth transistors are actuated, a first circuit connected to said first transistor for discharging inductive and capacitive energy from said first side of the line, a second circuit connected to said second transistor for discharging inductive and capacitive energy from said other side of the line, and electronic means for actuating said first, second, third and fourth transistors in a predetermined sequence.

3. A matrix selection system for a magnetic memory device comprising, a plurality of pairs of parallel conductors arranged in electrical rows and in electrical columns, said electrical rows electrically intersecting said electrical columns, and a plurality of selection units each corresponding to one of said intersections, each said selection unit comprising, a transformer having a secondary winding and two primary windings, a first diode in said secondary circuit, a transmission line having two sides, each side of the line including a portion of one of said column conductors and a portion of one of said row conductors and including also one of said primary windings, one side of the line including a second diode in series with the primary winding in that side of the line and the other side of the line including a third diode in series with the primary winding in said other side of the line, means reverse biasing said second and third diodes, a first electronic control device connected to one end of said one side of the line, a second electronic control device connected to the corresponding end of said other side of the line, said first and second electronic control devices being adapted to be actuated to provide an output for lessening the reverse biasing of said second and third dodes, means terminating one end of said transmission line in the characteristic impedance of the line when said first and second electronic control devices are actuated, a third electronic control device connected to the other end of said one side of the line, a fourth electronic control device connected to the other end of said other side of the line, said third and fourth electronic control devices being adapted to be actuated to provide an output and in such manner as to have at least a portion of their output in time coincidence with at least a portion of the output of said first and second electronic control devices to thereby forward bias said second and third diodes whereby current will flow in opposite directions through said sides, respectively, of said transmission line, means terminating the other end of said transmission line in the characteristic impedance of the line when said third and fourth electronic control devices are actuated, a first circuit connected to said first electronic control device for discharging inductive and capacitive energy from said first side of the line, a second circuit connected to said second electronic control device for discharging inductive and capactive energy from said other side of the line, and means for actuating said electronic control devices in a particular sequence.

4. A matrix selection system for a memory device comprising, a plurality of pairs of parallel conductors arranged in electrical rows and in electrical columns, said electrical rows electrically intersecting said electrical columns, and a plurality of selection units each corresponding to one of said intersections, each said selection unit comprising, a transformer having a secondary winding and two primary windings, a first unidirectional device in said secondary circuit for limiting current flow therein to one direction, a transmission line having two sides, each side of the line including a portion of one of said column conductors and a portion of one of said row conductors and including also one of said primary windings, one side of the line including a second unidirectional device in series with the primary winding in that side of the line for limiting current flow therein to one direction, and the other side of the line including a third unidirectional device in series with the primary winding in said other side of the line for limiting current flow therein to one direction, means reverse biasing said second and third unidirectional devices, a first electronic control device connected to one end of said one side of the line, a second electronic control device connected to the corresponding end of said other side of the line, said first and second electronic control devices being adapted to be actuated to provide an output for lessening the reverse biasing of said second and third unidirectional devices, means terminating one end of said transmission line in the characteristic impedance of the line when said first and second electronic control devices are actuated, a third electronic control device connected to the other end of said one side of the line, a fourth electronic control device connected to the other end of said other side of the line, said third and fourth electronic control devices being adapted to be actuated to provide an output and in such manner as to have at least a portion of their output in time coincidence with at least a portion of the output of said first and second electronic control devices to thereby forward bias said second and third unidirectional devices whereby current will flow in opposite directions through said sides, respectively, of said transmission line, means terminating the other end of said transmission line in the characteristic impedance of the line when said third and fourth electronic control devices are actuated, means connected to at least one of said electronic control devices for discharging inductive and capacitive energy from said transmission line, and meanns for first actuating said first and second electronic control devices and next actuating said third and fourth electronic control devices.

5. A matrix selection system for a memory device comprising, a plurality of pairs of parallel conductors arranged in electrical rows and in electrical columns, said electrical rows electrically intersecting said electrical columns, and a plurality of selection units each corresponding to one of said intersections, each said selection unit comprising, a transformer having a secondary winding and two primary windings, a first unidirectional device in said secondary circuit for limiting current flow therein to one direction, a transmission line having two sides, each side of the line including a portion of one of said column conductors and a portion of one of said row conductors and including also one of said primary windings, one side of the line including a second unidirectional device in series with the primary winding in that side of the line for limiting current flow therein to one direction, and the other side of the line including a third unidirectional device in series with the primary winding in said other side of the line for limiting current flow therein to one direction, means reverse biasing said second and third unidirectional devices, a first electronic control device connected to one end of said one side of the line, a second electronic control device connected to the corresponding end of said other side of the line, said first and second electronic control devices being adapted to be actuated to provide an output for lessening the reverse biasing of said second and third unidirectional devices, means terminating one end of said transmission line in the characteristic impedance of the line when said first and second electronic control devices are actuated, a third electronic control device connected to the other end of said one side of the line, a fourth electronic control device connected to the other end of said other side of the line, said third and fourth electronic control devices being adapted to be actuated to provide an output and in such manner as to have at least a portion of their output in time coincidence with at least a portion of the output of said first and second electronic control devices to thereby forward bias said second and third unidirectional devices whereby current will flow in opposite directions through said sides, respectively, of said transmission line, means terminating the other end of said transmission line in the characteristic impedance of the line when said third and fourth electronic control devices are actuated, and means for first actuating said first and second electronic control devices and next actuating said third and fourth electronic control devices.

6. A matrix selection system comprising, a plurality of pairs of parallel conductors arranged in electrical rows and in electrical columns, said electrical rows electrically intersecting said electrical columns, and a plurality of selection units each corresponding to one of said intersections, each said selection unit comprising, a transformer having a secondary winding and two primary windings, a first unidirectional device in said secondary circuit for limiting current flow therein to one direction, a transmission line having two sides, each side of the line including a portion of one of said column conductors and a portion of one of said row conductors and including also one of said primary windings, one side of the line including a second unidirectional device in series with the primary winding in that side of the line for limiting current flow therein to one direction, and the other side of the line including a third unidirectional device in series with the primary winding in said other side of the line for limiting current flow therein to one direction, means reverse biasing said second and third unidirectional devices, a first electronic control device connected to one end of said one side of the line, a second electronic control device connected to the corresponding end of said other side of the line, said first and second electronic control devices being adapted to be actuated to provide an output for lessening the reverse biasing of said second and third unidirectional devices, a third electronic control device connected to the other end of said one side of the line, a fourth electronic control device connected to the other end of said other side of the line, said third and fourth electronic control devices being adapted to be actuated to provide an output and in such manner as to have at least a portion of their output in time coincidence with at least a portion of the output of said first and second electronic control devices to thereby forward bias said second and third unidirectional devices whereby current will flow in opposite directions through said sides, respectively, of said transmission line, and means for first actuating said first and second electronic control devices and next actuating said third and fourth electronic control devices.

7. A matrix selection circuit comprising, a plurality of pairs of parallel conductors arranged in electrical rows and in electrical columns, said electrical rows electrically intersecting said electrical columns, and a plurality of selection units each corresponding to one of said intersections, each said selection unit comprising, a transmission line having two sides, each side of the line including a portion of one of said column conductors and a portion of one of said row conductors, one side of the line including a first unidirectional device for limiting current flow therein to one direction, and the other side of the line including a second unidirectional device for limiting current flow therein to one direction, means reverse biasing said unidirectional devices, a first electronic control device connected to one end of said one side of the line, a second electronic control device connected to the corresponding end of said other side of the line, said first and second electronic control devices being adapted to be actuated to provide an output for lessening the reverse biasing of said unidirectional devices, a third electronic control device connected to the other end of said one side of the line, a fourth electronic control device connected to the other end of said other side of the line, said third and fourth electronic control devices being adapted to be actuated to provide an output and in such manner as to have at least a portion of their output in time coincidence with at least a portion of the output of said first and second electronic control devices to thereby forward bias said unidirectional devices whereby current will flow in opposite directions through said sides, respectively of said transmission line, and means for actuating said first and second electronic control devices at a selected time and for actuating said third and fourth electronic control devices at a different time.

8. A matrix selection system comprising, a plurality of pairs of parallel conductors arranged in electrical rows and in electrical columns, said electrical rows electrically intersecting said electrical columns, and a plurality of selection units each corresponding to one of said intersections, each said selection unit comprising, a transmission line having two sides, each side of the line including a portion of one of said column conductors and a portion of one of said row conductors, first output means coupled to one side of said transmission line, second output means coupled to the other side of said transmission line, said one side of the line including a first unidirectional device in series with said first output means for limiting current flow therethrough to one direction, and said other side of the line including a second unidirectional device in series with said second output means for limiting current flow therethrough to one direction, means reverse biasing said unidirectional devices, a first electronic control device connected to one end of said one side of the line, a second electronic control device connected to the corresponding end of said other side of the line, said first and second electronic control devices being adapted to be actuated to provide an output for lessening the reverse biasing of said unidirectional devices, a third electronic control device connected to the other end of said one side of the line, a fourth electronic control device connected to the other end of said other side of the line, said third and fourth electronic control devices being adapted to be actuated to provide an output and in such manner as to have at least a portion of their output in time coincidence with at least a portion of the output of said first and second electronic control devices to thereby forward bias said unidirectional devices whereby current will flow in opposite direction through said first and second output means, respectively, and means for actuating said electronic control devices.

9. A matrix selection circuit comprising, a plurality of pairs of parallel conductors arranged in electrical rows and in electrical columns, said electrical rows electrically intersecting said electrical columns, and a plurality of selection units each corresponding to one of said intersections, each said selection unit comprising, a transmission line having two sides, each side of the line including a portion of one of said column conductors and a portion of one of said row conductors, said one side of the line including a unidirectional device for limiting current flow therein to one direction, and said other side of the line including a unidirectional device for limiting current flow therein to one direction, means reverse biasing said unidirectional devices, a first electronic control device connected to one end of said one side of the line, a second electronic control device connected to the corresponding end of said other side of the line, said first and second electronic control devices being adapted to be actuated to provide an output for lessening the reverse biasing of said unidirectional devices, a third electronic control device connected to the other end of said one side of the line, a fourth electronic control device connected to the other end of said other side of the line, said third and fourth electronic control devices being adapted to be actuated to provide an output and in such manner as to have at least a portion of their output in time coincidence with at least a portion of the output of said first and second electronic control devices to thereby forward bias said unidirectional devices whereby current will flow in opposite directions through said sides, respectively, of said transmission line, and means for actuating said electronic control devices.

10. A matrix selection circuit comprising, a plurality of pairs of parallel conductors arranged in electrical rows and in electrical columns, said electrical rows electrically intersecting said electrical columns, and a plurality of selection units each corresponding to one of said intersections, each said selection unit comprising, a transmission line having two sides, each side of the line including a portion of one of said column conductors and a portion of one of said row conductors, output means electrically connected in the medial portion of said transmission line, unidirectional means in said transmission line for limiting current flow through said output means to one direction, means reverse biasing said unidirectional means, first electronic control means connected to one end of said transmission line and being adapted to be actuated to provide an output for lessening the reverse biasing of said unidirectional means, second electronic control means connected to the other end of said transmission line and being adapted to be actuated to provide an output and in such manner as to have at least a portion of its output in time coincidence with at least a portion of the output of said first electronic control means to thereby forward bias said unidirectional means whereby current will flow through said output means, and means for actuating said first and second electronic control means.

11. A selection circuit comprising, a transmission line, an output device coupled to the medial portion of said transmission line, unidirectional means arranged to limit current flow through said output device to one direction, means reverse biasing said unidirectional means, first electronic control means coupled to one end of said transmission line and adapted to be actuated to provide an output for lessening the reverse biasing of said unidirectional means, means terminating one end of said transmission line in its characteristic impedance when said first electronic control means is actuated, second electronic control means coupled to the other end of said transmission line and adapted to be actuated to provide an output at least a portion of which is in time coincidence with at least a portion of the output of said first electronic control means to thereby forward bias said unidirectional means whereby current will flow through said output device, and means terminating the other end of said transmission line in its characteristic impedance when said second electronic control means is actuated.

12. A selection circuit according to claim 11 wherein the conductors of said transmission line are twisted together helically.

13. A selection circuit comprising, a transmission line, an output device coupled to the medial portion of said transmission line, unidirectional means arranged to limit current flow through said output device to one direction, means reverse biasing said unidirectional means, first electronic control means coupled to one end of said transmission line and adapted to be actuated to provide an output for lessening the reverse biasing of said unidirectional means, second electronic control means coupled to the other end of said transmission line and adapted to be actuated to provide an output at least a portion of which is in time coincidence with at least a portion of the output of said first electronic control means to thereby forward bias said unidirectional means whereby current will flow through said output device, and means terminating said transmission line in its characteristic impedance when either said first or said second electronic control means is actuated.

14. A selection circuit comprising, a transmission line having two sides, unidirectional means arranged to limit current flow in said transmission line sides to opposite directions, means reverse biasing said unidirectional means, first electronic control means coupled to one end of said transmission line and adapted to be actuated to provide an output for lessening the reverse biasing of said unidirectional means, and second electronic control means coupled to the other end of said transmission line and adapted to be actuated to provide an output at least a portion of which is in time coincidence with at least a portion of the output of said first electronic control means to thereby forward bias said unidirectional means whereby current will flow in opposite directions in said transmission line sides.

15. A current driver system for a magnetic memory comprising, a transformer having a secondary winding coupled to a magnetic storage means and a pair of primary windings, an asymmetrical current conducting device connected to each of said primary windings, a pair of row conductors and a pair of column conductors forming a pair of series circuits including said primary windings and said asymmetrical current conducting devices, said asymmetrical current conducting devices being oppositely poled so as to permit current to flow through said series circuits in opposite directions, said primary windings being wound so as to cause an additive current flow in said secondary winding in response to said current flow in said series circuits, and switching means connected to said pair of series circuits to selectively cause said asymmetrical current conducting devices to be forward biased enabling current flow in both said series circuits.

16. A current driver system in accordance with claim 15 characterized further by the inclusion of, a plurality of said pairs of series circuits forming a matrix in which each pair of said column conductors electrically intersects at least one pair of said row conductors, a plurality of said transformers each having its said secondary winding at one of said electrical intersections, a plurality of said switching means, and means for selectively actuating one of said switching means to provide current flow in the secondary winding associated with the selected pair of said series circuits.

17. A current driver system in accordance with claim 15 wherein said pair of series circuits is arranged substantially in the form of a transmission line and means is provided for terminating either end of the line in its characteristic impedance.

18. A current driver system in accordance with claim 16 wherein each said pair of series circuits is arranged substantially in the form of a transmission line and each said switching means is connected to both ends of its associated line.

19. A current driver system in accordance with claim 18 wherein means is provided for terminating either or both ends of each transmission line in its characteristic impedance.

20. A current driver system for a magnetic memory comprising, first and second asymmetrical current conducting devices, a pair of row conductors and a pair of column conductors forming a pair of transmission line sides each including one of said asymmetrical current conducting devices, said asymmetrical current conducting devices being oppositely poled so as to permit current to flow through said sides in opposite directions, means inductively coupling said transmission line sides to said magnetic memory, and switching means connected to said transmission line sides to selectively cause said asymmetrical current conducting devices to be forward biased enabling current flow in both said transmission line sides.

21. A current driver system according to claim 20 wherein at least one of the conductors in each said pair exhibits an undulating configuration.

References Cited

UNITED STATES PATENTS

| | | | |
|---|---|---|---|
| 3,054,905 | 9/1962 | Lee | 307—88 |
| 2,902,677 | 9/1959 | Counihan | 340—174 |
| 3,056,948 | 10/1962 | Lee | 340—174 |
| 3,135,948 | 6/1964 | Ashley | 340—174 |
| 3,175,203 | 3/1965 | Bice | 340—174 |
| 3,188,499 | 6/1965 | Xylander | 307—93 |
| 3,210,741 | 10/1965 | Cohler et al. | 340—174 |
| 3,231,753 | 1/1966 | Brown | 307—88.5 |
| 3,237,015 | 2/1966 | Will | 307—88 |
| 3,339,190 | 8/1967 | Kaufman | 340—174 |
| 3,351,924 | 11/1967 | Meyerhoff et al. | 340—174 |

STANLEY M. URYNOWICZ, Jr., *Primary Examiner.*